United States Patent [19]

Pellenz et al.

[11] Patent Number: 5,531,076
[45] Date of Patent: Jul. 2, 1996

[54] MULTI-SPLIT FAN CONTROL

[75] Inventors: Peter J. Pellenz, Syracuse; Richard D. Dennis, Bridgeport, both of N.Y.

[73] Assignee: Carrier Corporation, Syracuse, N.Y.

[21] Appl. No.: 427,860

[22] Filed: Apr. 26, 1995

[51] Int. Cl.[6] .............................. F25B 39/04; F25D 17/06
[52] U.S. Cl. .............................................. 62/184; 62/428
[58] Field of Search .............................. 62/184, 181, 428, 62/510, DIG. 17

[56] References Cited

U.S. PATENT DOCUMENTS

| | | | |
|---|---|---|---|
| 3,059,448 | 10/1962 | McGrath | 62/510 X |
| 4,104,890 | 8/1978 | Iwasaki | 62/510 X |
| 4,326,387 | 4/1982 | Friedman | 62/184 |
| 4,643,002 | 2/1987 | Dennis et al. | 62/525 |
| 5,247,805 | 9/1993 | Dennis | 62/184 |

*Primary Examiner*—William E. Wayner

[57] ABSTRACT

A compressor discharge pressure control for a unitary outdoor fan, multi-split air conditioning system having multiple compressors, multiple evaporator coils, multiple condenser coils and a single outdoor fan. Pressure comparison circuitry compares the discharge pressures of the compressors to predetermined pressure levels to generate a plurality of pressure state signals. On/off monitoring circuitry monitors the on/off states of the compressors to generate a plurality of compressor state signals. Control circuitry controls the fan in accordance with both sets of signals under a predetermined priority scheme.

8 Claims, 3 Drawing Sheets

| | CASE # | COMP 120A | PRESS 250 | PRESS 375 | COMP 120B | PRESS 250 | PRESS 375 | FAN 140 STATE |
|---|---|---|---|---|---|---|---|---|
| A { | 1 | OFF | X | X | OFF | X | X | OFF |
| B { | 2 | ON | < | < | OFF | X | X | OFF |
|     | 3 | ON | > | < | OFF | X | X | ON |
|     | 4 | ON | X | > | OFF | X | X | ON |
| C { | 5 | ON | < | < | ON | < | < | OFF |
|     | 6 | ON | > | < | ON | < | < | OFF |
|     | 7 | ON | < | < | ON | > | < | OFF |
|     | 8 | ON | > | < | ON | > | < | ON |
|     | 9 | ON | X | > | ON | X | X | ON |
|     | 10 | ON | X | X | ON | X | > | ON |
| D { | 11 | OFF | X | X | ON | < | < | OFF |
|     | 12 | OFF | X | X | ON | > | < | ON |
|     | 13 | OFF | X | X | ON | X | > | ON |

KEY: < MEANS LESS THAN
> MEANS GREATER THAN
X MEANS DON'T CARE
PRESSURES ARE POUNDS PER SQUARE INCH (PSI).

FIG.2

MULTI-SPLIT FAN CONTROL

BACKGROUND OF THE INVENTION

1. Field of the Invention

This invention relates to air conditioning systems and specifically to a method and apparatus for controlling the discharge pressure of the compressors in a unitary fan, multi-split system.

2. Description of the Prior Art

Control of compressor discharge pressure by fan cooling for air conditioning systems to protect against low discharge levels is well known in the art. If adequate pressure is not maintained at low ambient temperatures, the evaporator temperature may drop below freezing on cold days and cause condensation moisture to freeze on the evaporator coil. The resulting layer of ice tends to insulate the coil from the refrigeration mode and causes a further reduction in system capacity.

Control of compressor discharge pressure by unitary fan cooling has not heretofore been used in a multi-split air conditioning system. The fan control is used on a multi-split system to prevent freeze up of a fan coil when it is the only one running. On a multi-split unit, when all fan coils are operating the suction pressure stays up and the fan coils will not freeze. However, when just one fan coil is running, the suction pressure and temperature will drop and the coil may freeze. By properly controlling the outdoor fan the discharge pressure may be kept up, keeping the suction pressure up and preventing the coil from freezing. Difficulties arise, however, when a single fan is used with multiple coils. This is because one coil may require its fan to be on while the other does not.

SUMMARY OF THE INVENTION

It is therefore a primary object of the present invention to provide control of compressor discharge pressures by fan cooling of multiple condensers in a multi-split air conditioning system.

It is a further object of the present invention to control the discharge pressures of multiple compressors using only one fan.

These and other objects of the present invention are attained by a compressor discharge pressure control for a unitary fan, multi-split air conditioning system of a type having a plurality of compressors, a plurality of indoor evaporator coils, and a plurality of outdoor condenser coils cooled by only one motor driven outdoor fan. The control includes discharge pressure comparison circuitry for comparing a plurality of compressor discharge pressure signals with a plurality of signal levels indicative of the maximum and minimum acceptable discharge pressures, and circuitry for turning the fan on and off based on the results of these comparisons, using a predetermined priority schedule.

BRIEF DESCRIPTION OF THE DRAWING

For a better understanding of these and other objects of the present invention, reference is made to the detailed description of the invention which is to be read in conjunction with the following drawings, wherein:

FIG. 2 is a state table showing the state of the fan for various combinations of compressor discharge pressures.

DESCRIPTION OF THE PREFERRED EMBODIMENT

Figure 1:
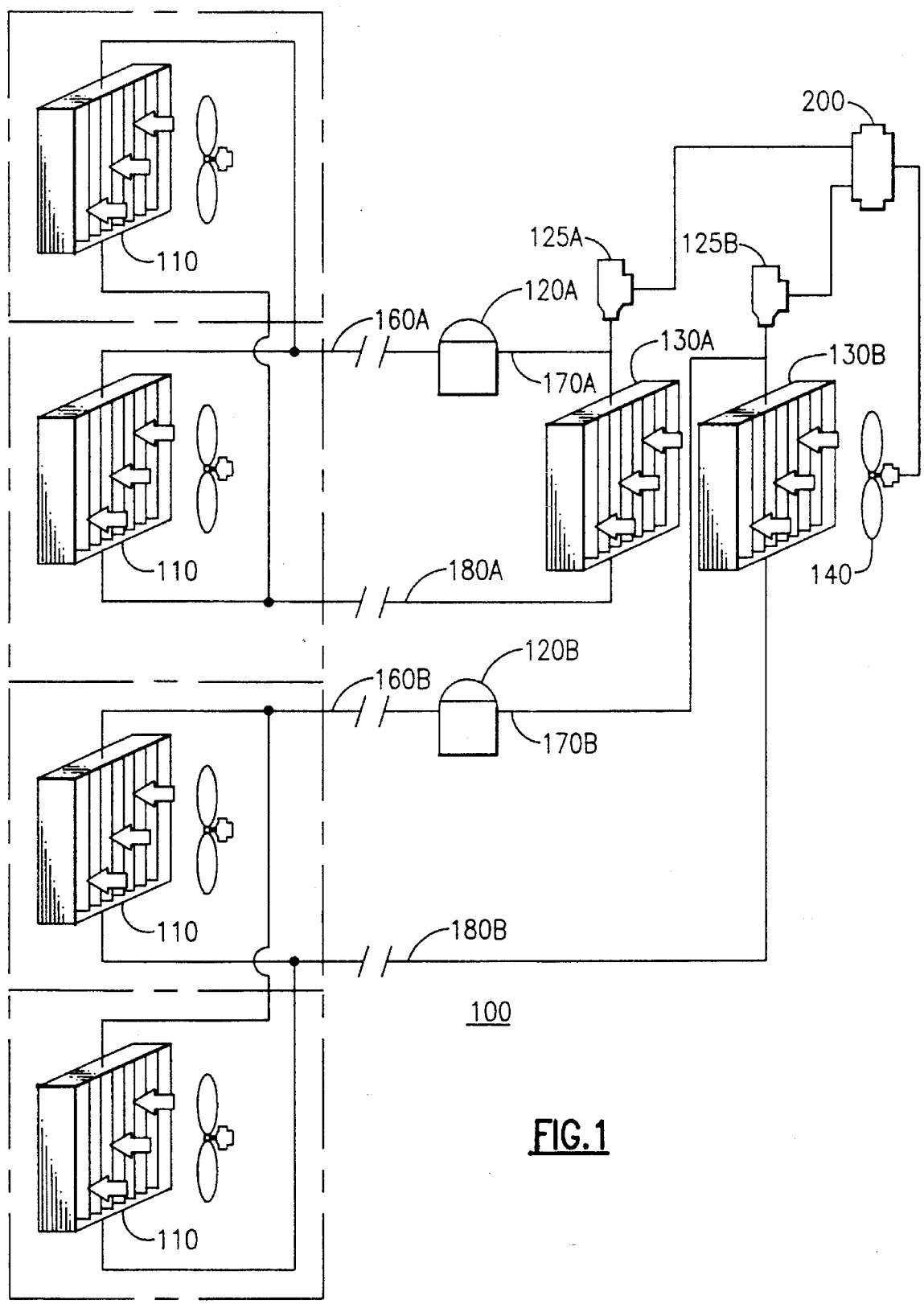
FIG. 1 is a system diagram of a unitary outdoor fan, multi-split air conditioning system.

Referring initially to FIG. 1, there is shown a simplified system diagram of a unitary outdoor fan, multi-split air conditioning system 100. The system 100 includes multiple evaporator coils 110, and multiple indoor fans 115, each coil and fan being located in a respective conditioned space. System 100 also includes two compressors 120A and 120B, two compressor discharge pressure sensors 125A and 125 B, two condensers 130A and 130B, one outdoor fan 140, and one fan control circuit 200. Evaporator coils 110 boil liquid refrigerant into gas by extracting heat from the conditioned space. The high temperature, low pressure gas is suctioned to compressors 120A and 120B through respective suction lines 160A and 160B. The compressors compress the gas and discharge it through respective discharge lines 170A and 170B to respective condenser coils 130A and 130B where outside air is blown across the coils by the outdoor fan 140. Heat is removed from the gas and transferred to the outside air. Condensers 130A and 130B transform the hot gas into low temperature, high pressure liquid which returns to the evaporator coils 110 via respective liquid lines 180A and 180B. Discharge pressure sensors 125A and 125B monitor the discharge pressures of compressors 120A and 120B. Fan control circuit 200 controls the compressor discharge pressure by controlling the power cycling of outdoor fan 140. It will be understood that a number of the components of the system shown in FIG. 1, such as solenoid valves, which are not directly related to the subject matter of the present invention have been omitted from FIG. 1 for the sake of clarity.

In operation fan 140 is used to keep the compressor discharge pressure within predetermined minimum and maximum values. If this pressure is too low, indicating that one or more of evaporator coils 110 is operating in a light or underloaded condition, it is desirable to turn off fan 140 to raise the pressure and temperature of the refrigerant and thereby prevent the lightly loaded coil from freezing. If this pressure attempts to rise to too high a value, it is necessary to turn on fan 140 to prevent an excessive pressure from being reached. Fan control circuits capable of switching a fan on and off to meet these requirements for a single condenser coil are known in the art.

Difficulties arise, however, if an attempt is made to use a single fan to perform the above-described function with two compressors that operate with different respective groups of conditioned spaces. The discharge pressure for one compressor may call for its fan to be on while the discharge pressure of the other may call for its fan to be off. Because of these difficulties, it has, prior to the present invention, not been possible to use a single fan to control the discharge pressures of two compressors.

In accordance with the invention, there is provided a fan control circuit which is responsive to the discharge pressures of two different compressors, and which produces a fan control signal that allows the fan to meet the requirements of both compressors according to a predetermined priority scheme. In accordance with the invention this is accomplished by creating a state table that indicates the state which the fan is to be in for each possible combination of compressor discharge pressures, and by providing circuitry that generates a fan control signal which turns the fan on and off in accordance with the requirements of that state table.

Referring to FIG. 2, there is shown a state table which is suitable for use in controlling fan 140 of the multi-split air conditioning system of FIG. 1. This state table defines the thirteen combinations of states that can exist in an air conditioning system that includes two compressors, either of which can be on or off, and each of which is to have a discharge pressure that is within an exemplary pressure range of from 250 to 375 psi. This table also includes the desired state of the fan for each of these combinations of compressor states and pressure states. In accordance with the invention the fan states shown in the table are based in part on a priority scheme which reflects the judgement that it is more important to prevent the discharge pressure of a compressor from exceeding its maximum pressure of 375 psi than it is to prevent it from falling below its minimum pressure of 250 psi.

The thirteen combinations of states or cases shown in FIG. 2 naturally divide themselves into four subgroups or subsets of states A through D. Subgroup A, which encompasses only case no. 1, includes those combinations of states in which both compressors are off. Subgroups B and D, which encompass cases 2–4 and 11–13, respectively include those combinations of states in which one compressor is off while the other compressor is on. Subgroup C, which encompasses cases 5–10, includes those combinations of states in which both compressors are on.

The fan control criteria and priority scheme embodied in the state table of FIG. 2 may be summarized as follows. When the requirements of subgroup A are met, i.e., both compressors are off, the fan control signal will be in its off state and the fan will be off. When the requirements of subgroups B or D are met, i.e., only one compressor is on, the state of the fan control signal is dependent solely upon the discharge pressure of the compressor that is on, as indicated by the "X" or "don't care" entries in the boxes for the compressor that is off. For the compressor that is on, the state of the fan control signal will depend on how the discharge pressure of that compressor is related to the pressure criteria embodied in the table. More particularly, the fan control signal will be in its on state either if the discharge pressure of the compressor is between 250 and 375 psi, or if the discharge pressure is greater than 375 psi, and will be off under all other conditions. Because none of subgroups A, B, or D includes a state in which both compressors are on, none of these subgroups requires the resolution of conflicting fan requirements under a priority scheme.

When the requirements of subgroup C are met, i.e., both compressors are on, the state of the fan control signal depends not only on how the discharge pressure of each compressor is related to its own pressure criteria, but also on how that discharge pressure is related to the pressure criteria of the other compressor under the priority scheme of the system. More particularly, if the discharge pressure of either compressor exceeds 375 psi, the fan control signal will be in its on state without regard to the discharge pressure of the other. For all other sets of conditions of subgroup C, the fan control signal will be in its on state unless the discharge pressures of one compressor is less than 250 psi. In other words, an overpressure condition in either compressor is given unconditional priority, and the requirement of either compressor for fan operation is given the next highest priority.

Figure 3:
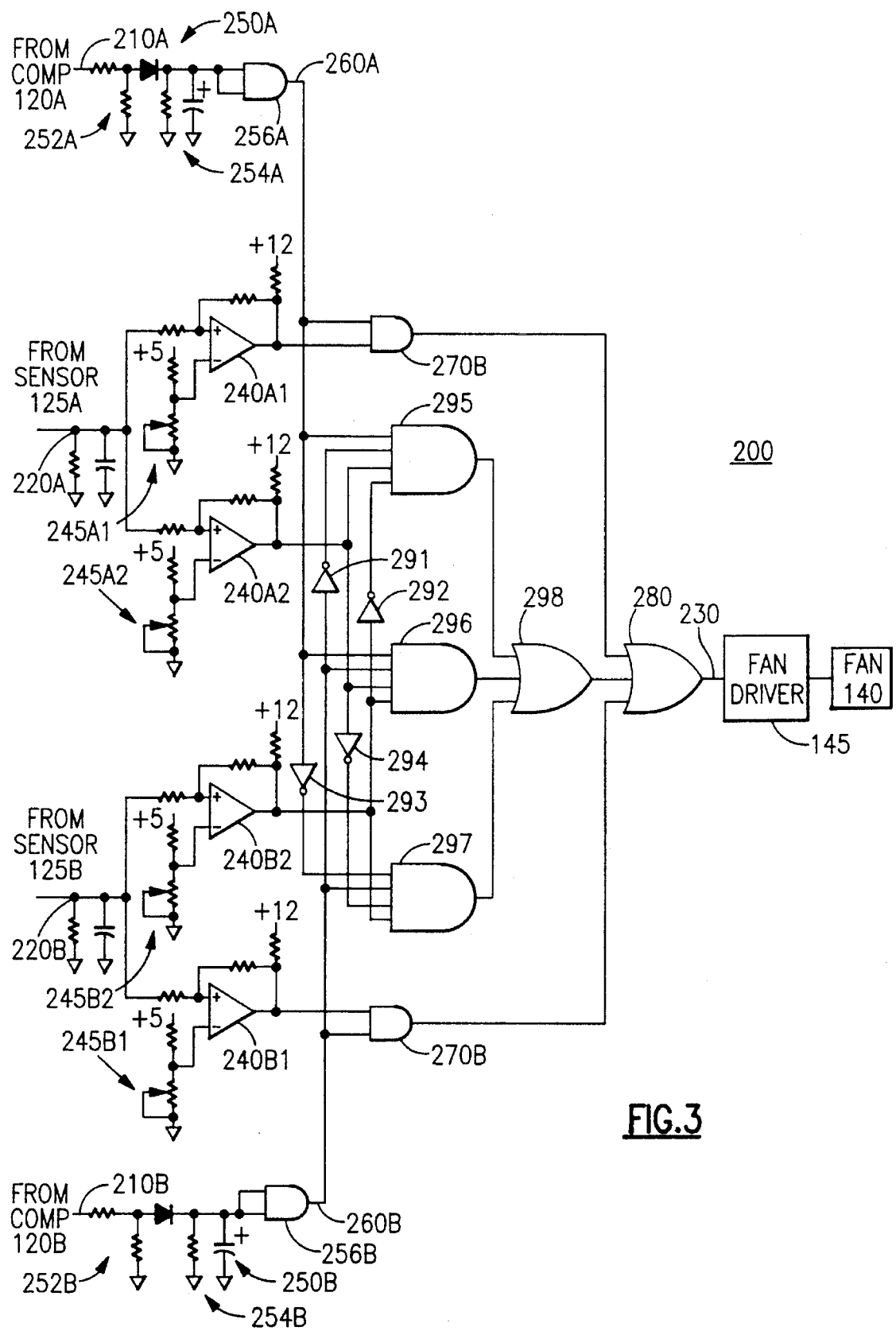
FIG. 3 is a logic schematic of diagram control circuitry for use in controlling the fan of FIG. 1 in accordance with the state table of FIG. 2.

Referring to FIG. 3, there is shown a logic-schematic diagram of one fan control circuit 200 which is suitable for use in implementing the control scheme embodied in the table of FIG. 2. Control circuit 200 has two inputs 210A and 210B which receive signals indicative of the on/off states of compressors 120A and 120B, respectively. Control circuit 200 also has two inputs 220A and 220B which are coupled to pressure sensors 125A and 125B, respectively, to receive signals indicative of the discharge pressures of compressors 120A and 120B. Finally, control circuit 200 has an output 230 which controls fan 140 via a suitable fan driver device 145 such as a relay or triac.

To the end that the discharge pressures of compressors 120A and 120B may be compared to the pressure values set out in Table 2, fan control circuit 200 includes a first pair of comparators 240A1 and 240A2, each having an input connected to pressure input 220A and a second pair of comparators 240B1 and 240B2, each having an input connected to pressure input 220B. The remaining inputs of each pair of comparators are connected to voltage dividers which are adjusted to provide reference voltages that correspond to the maximum and minimum pressures values of Table 2. More particularly, voltage dividers 245A1 and 240B1 establish reference voltages which correspond to the maximum discharge pressure of 375 psi, and voltage dividers 245A2 and 245B2 establish reference voltages which correspond to the minimum discharge pressure of 250 psi. As a result, comparators 240A1 and 240B1 produce two state output voltages which indicate whether the discharge pressures of the respective compressors are or are not greater than 375 psi, and comparators 240A2 and 240B2 produce two state output voltages which indicate whether the discharge pressures of the respective compressors are or are not less than 250 psi. These four output voltages will hereinafter be referred to as pressure state signals. Because the operation of comparators is well known to those skilled in the art, the operation of the comparator circuits of FIG. 3 will not be further described herein.

To the end that the AC voltages at inputs 210A and 210B may be converted to two state digital signals which indicate the on and off states of compressors 120A and 120B, fan control circuit 200 includes state monitoring interfacing circuits 250A and 250B. Each of these monitoring circuits includes a voltage divider (252A, 252B) for scaling the input voltages at inputs 210A and 210B, a rectifier-filter network (254A, 254B) for converting the scaled input voltages to a filtered DC voltage and a gate (256A, 256B) for converting the filtered DC voltage to a two state signal having voltage values compatible with those used by the remaining circuitry of FIG. 3. The latter signals appear at gate outputs 260A and 260B and will hereinafter be referred to as compressor state signals.

Together, the four pressure state signals and the two compressor state signals are the electrical counterparts of the six leftmost columns of compressor and pressure data shown in the table of FIG. 2. It is the function of the digital logic circuitry of FIG. 3 to combine these six signals, on the basis of the priority scheme embodied in the table of FIG. 2, so as to produce the fan control signal shown in the rightmost column of the table of FIG. 2.

As explained previously, the highest priority is accorded to the presence of a discharge pressure higher than 375 psi in either compressor. In the circuit of FIG. 3 this priority is implemented by two AND gates 270A and 270B and an OR gate 280. Together these elements implement the following logical statement: If either compressor is on, and has a discharge pressure greater than 375 psi, the fan is to be on without regard to the state of any other signals.

Similarly, the next highest priority is accorded to the turn on of the fan if the discharge pressure of either compressor indicates that fan operation is called for, without regard to whether the other compressor is on or off and does not require fan operation. In the circuit of FIG. 3, this priority is implemented by four inverters 291–294, three four input AND gates 295, 296 and 297 and a three input OR gate 298, the latter exerting its control via previously discussed OR gate 280. Because the manner in which the latter elements effectuate the logical requirements of the remainder of the table of FIG. 2 will be apparent to those skilled in the art, the operation thereof will not be further described herein.

In view of the foregoing it will be seen that the present invention comprises circuitry which controls the on/off state of a fan on the basis of compressor state and pressure state signals for two separate and independent compressors, and which provides for the resolution of conflicting compressor requirements according to a predetermined priority scheme. As a result, the circuitry of the invention is able to meet the requirements of both compressors by means of a single fan.

While this invention has been described with reference to an embodiment utilizing a particular state table and particular priority scheme, it will be understood that other state tables and priority schemes could be used without departing from the teachings of the invention. Accordingly, the true spirit and scope of the present invention should be determined only with reference to the appended claims.

What is claimed is:

1. A compressor discharge pressure control apparatus for a unitary fan, multi-split air conditioning system of a type having a plurality of compressors, a plurality of indoor evaporator coils, and a plurality of outdoor condenser coils cooled by a single outdoor fan, comprising:

discharge pressure comparison means for comparing a plurality of compressor discharge pressure measurements with a plurality of predetermined pressure levels and generating a plurality of pressure state signals;

means for generating a plurality of compressor state signals indicative of the running state of said compressors; and control means for turning said fan on and off in accordance with said pressure control signals and said compressor state signals.

2. The compressor discharge control apparatus of claim 1 in which said predetermined pressure levels includes a minimum pressure level indicative of a compressor operating in an underloaded condition, and a maximum pressure level indicative of a compressor operating in an overloaded condition.

3. The compressor discharge control apparatus of claim 1 in which said control means combines said pressure state and compressor state signals in accordance with a predetermined priority scheme.

4. The compressor discharge control apparatus of claim 2 in which said control means turns on said fan when either of said compressors is running and produces a discharge pressure in excess of said predetermined maximum pressure.

5. A method for regulating a compressor discharge pressure in a unitary fan, multi-split air conditioning system having a plurality of compressors, a plurality of indoor evaporator coils, and a plurality of outdoor condenser coils cooled by a single outdoor fan, comprising the steps of:

continuously sensing the discharge pressures of said compressors;

comparing said discharge pressures with a plurality of predetermined pressure levels to generate a plurality of pressure state signals;

generating a plurality of compressor state signals indicative of the on/off states of said compressors; and controlling the on/off state of said fan in accordance with said pressure state and compressor state signals.

6. The method of claim 5 in which said predetermined pressure levels includes a minimum pressure level indicative of a compressor operating in an underloaded condition, and a maximum pressure level indicative of a compressor operating in an overloaded condition.

7. The method of claim 6 in which said controlling step comprises the step of combining the pressure state and compressor state signals in accordance with a predetermined priority scheme.

8. The method of claim 7 in which said priority scheme calls for said fan to be on if either of the compressors is in its on state and is producing a discharge pressure in excess of said maximum pressure level.

\* \* \* \* \*